(12) United States Patent
Hu

(10) Patent No.: US 8,474,783 B2
(45) Date of Patent: Jul. 2, 2013

(54) CONNECTION STRUCTURE OF VEHICULAR ENGINE MOUNTING AND FRONT PLATE OF FRONT WHEEL COWLING

(75) Inventor: Zhimin Hu, Chongqing (CN)

(73) Assignee: Chongqing Lifan EFI Software Co., Ltd., Shapingba District, Chongqing (CN)

( * ) Notice: Subject to any disclaimer, the term of this patent is extended or adjusted under 35 U.S.C. 154(b) by 0 days.

(21) Appl. No.: 13/505,445

(22) PCT Filed: Jun. 20, 2011

(86) PCT No.: PCT/CN2011/075939
§ 371 (c)(1), (2), (4) Date: May 1, 2012

(87) PCT Pub. No.: WO2012/068872
PCT Pub. Date: May 31, 2012

(65) Prior Publication Data
US 2012/0261544 A1 Oct. 18, 2012

(30) Foreign Application Priority Data

Nov. 24, 2010 (CN) .......................... 2010 1 0556971

(51) Int. Cl.
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |

(52) U.S. Cl.
USPC ........... 248/638; 248/560; 248/562; 248/566; 248/571; 248/608; 248/606; 248/646; 248/647

(58) Field of Classification Search
USPC ................. 248/560, 562, 566, 571, 608, 638, 248/646, 647; 180/184; 280/159–160; 305/100–116
See application file for complete search history.

(56) References Cited

U.S. PATENT DOCUMENTS 2,722,034 A * 11/1955 May .............................. 16/268
3,815,701 A * 6/1974 Mayhew ..................... 180/69.21
(Continued)

FOREIGN PATENT DOCUMENTS

| CN | 201220591 | 4/2009 |
| CN | 101445132 | 6/2009 |

(Continued)

*Primary Examiner* — Terrell McKinnon
*Assistant Examiner* — Michael McDuffie
(74) *Attorney, Agent, or Firm* — Merchant & Gould P.C.

(57) ABSTRACT

A connection structure of a vehicular engine mounting and a front plate of a front wheel cowling is disclosed. The engine mounting includes a damper assembly, an upper mount bracket and a lower mount bracket. One end of the upper mount bracket corresponding to the front plate of the front wheel cowling is provided with a lug, and the lug is of a "Z" shape and includes a first locating plate, a second locating plate and a transitional plate. The first locating plate and the second locating plate is connected with each other via the transitional plate, and the first locating plate abuts against the front plate of the front wheel cowling and is fixed thereto by bolts. The second locating plate and the transitional plate are protruded into the locating hole in the front plate of the front wheel cowling. The connection structure of the vehicular engine mounting and the front plate of the front wheel cowling can reduce the connection processes of the upper mount bracket of the engine and the front plate of the front wheel cowling from two steps to one step without increasing the cost. As a result, the assembling time is reduced by nearly a half, and the assembling efficiency is doubled, which not only simplifies difficulty in assembling but also reduces labor intensity of the operator efficiently, meanwhile it can avoid damage to the components and accidental injury to the operator caused by falling of the engine mounting.

5 Claims, 2 Drawing Sheets

U.S. PATENT DOCUMENTS

| | | | | |
|---|---|---|---|---|
| 3,834,344 | A | * | 9/1974 | Yoshino ........................ 440/112 |
| 4,079,498 | A | * | 3/1978 | Blevins .......................... 29/434 |
| 4,401,298 | A | * | 8/1983 | Eaton et al. ............. 267/140.13 |
| 4,437,529 | A | | 3/1984 | Fralish |
| 5,718,407 | A | * | 2/1998 | Lee ............................... 248/634 |
| 6,513,196 | B2 | * | 2/2003 | Snowden et al. ............... 16/268 |
| 7,621,156 | B2 | * | 11/2009 | Kim et al. ..................... 68/23 R |
| 2004/0159995 | A1 | * | 8/2004 | Pavuk .......................... 267/248 |

FOREIGN PATENT DOCUMENTS

| | | |
|---|---|---|
| CN | 101863288 | 10/2010 |
| CN | 101982329 | 3/2011 |
| CN | 201881873 | 6/2011 |
| JP | 2005112175 | 4/2005 |

* cited by examiner

CONNECTION STRUCTURE OF VEHICULAR ENGINE MOUNTING AND FRONT PLATE OF FRONT WHEEL COWLING This application is a National Stage Application of PCT/CN2011/075939, filed 20 Jun. 2011, which claims benefit of Serial No. 201010556971.6, filed 24 Nov. 2010 in China and which applications are incorporated herein by reference. To the extent appropriate, a claim of priority is made to each of the above disclosed applications.

FIELD OF THE INVENTION

The present invention relates to the technical field of a vehicle, in particular, especially to a connection structure of a vehicular engine mounting and a front plate of a front wheel cowling.

BACKGROUND OF THE INVENTION

At present, both the left end and the right end of a vehicular engine are connected with the vehicle body through an engine mounting. The engine mounting consists of a damper assembly, an upper mount bracket and a lower mount bracket. The damper assembly is connected with the engine. A flat lug at an end of the upper mount bracket is connected with a front plate of a front wheel cowling on the vehicle body by bolts, and the lower mount bracket is connected with a stringer of the vehicle body by bolts. Since the engine mounting is generally heavy, during the assembling of the upper mount bracket and the front plate of the front wheel cowling, the engine mounting needs to be supported by an operator with one hand, or else the engine mounting would easily fall off under the condition that the center of gravity of the engine mounting is offset, which would damage the components of the engine mounting or injure the operator. Besides, a pneumatic gun needs to be grasped by the operator with another hand, and a bolt at the head of the pneumatic gun also needs to be stabilized by the operator's hand, which would make it more difficult for a single operator to assemble the engine mounting. Now, the conventional method of assembling the engine mounting by a single operator in a workshop of a vehicle manufacturer is as follows: firstly, the pneumatic gun is put down, the engine mounting is supported by the operator with one hand, and the bolts are preliminarily screwed to the engine mounting by the operator with another hand; then, the bolts are fastened to the engine mounting by the operator with the pneumatic gun. In this way, it needs two steps to assemble the engine mounting to the front plate of the front wheel cowling, which not only increases the labor intensity of the operator but also needs longer assembling time, thus the efficiency is low.

SUMMARY OF THE INVENTION

The technical problem to be solved by the present invention is to provide a connection structure of a vehicular engine mounting and a front plate of a front wheel cowling, to reduce the difficulty in assembling and increase assembling efficiency.

The technical solutions of the present invention are as follows: a connection structure of a vehicular engine mounting and a front plate of a front wheel cowling including an engine mounting and a front plate of a front wheel cowling. The engine mounting includes a damper assembly, an upper mount bracket and a lower mount bracket. One end of the upper mount bracket corresponding to the front plate of the front wheel cowling is provided with a lug. The key point lies in that: the lug is of a "Z" shape and includes a first locating plate, a second locating plate and a transitional plate. The first locating plate and the second locating plate are connected with each other via the transitional plate, and the first locating plate abuts against the front plate of the front wheel cowling and is fixed thereto by bolts. The front plate of the front wheel cowling is formed with a locating hole, and the position of the locating hole corresponds to that of the lug. The second locating plate and the transitional plate of the lug are protruded into the locating hole in the front plate of the front wheel cowling.

In the present invention, the traditional flat structure of the lug at an end of the upper mount bracket is changed into a "Z" shape structure. Accordingly, the front plate of the front wheel cowling is formed with a locating hole. When assembling the engine mounting and the front plate of the front wheel cowling, firstly, the engine mounting is raised so that the second locating plate and the transitional plate of the "Z" shape lug at an end of the upper mount bracket can protrude into the locating hole in the front plate of the front wheel cowling; then, the engine mounting is released slowly until the first locating plate abuts against the outer surface of the front plate of the front wheel cowling and the second locating plate is clasped on the inner surface of the front plate of the front wheel cowling. Under the own weight of the engine mounting, the first locating plate exerts an inward force to the outer surface of the front plate of the front wheel cowling and the second locating plate exerts an outward force to the inner surface of the front plate of the front wheel cowling. As a result, the "Z" shape lug is limited by the front plate of the front wheel cowling such that the engine mounting is suspended on the front plate of the front wheel cowling of the vehicle body stably, without being held by the operator. At this time, the assembling of the upper mount bracket to the front plate of the front wheel cowling can be finished in one step with the pneumatic gun being held by the operator with one hand and the bolts being held by the operator with another hand, which not only makes the operation easier and more convenience but also multiplies the assembling efficiency by several times.

The upper mount bracket and the lug are formed into one piece by stamping. Thus manufacturing thereof is easy and hardly causes increased manufacturing cost.

There is an angle ranged from 100° to 110° between the first locating plate and the transitional plate, and there is an angle ranged from 110° to 120° between the transitional plate and the second locating plate. The above structure can ensure that the second locating plate and the transitional plate can be protruded into the locating hole in the front plate of the front wheel cowling conveniently and quickly, and that the second locating plate can be clasped on the inner surface of the front plate of the front wheel cowling stably, which efficiently avoid damage to the engine mounting and accidental injury to the operator caused by falling of the engine mounting.

Preferably, the angle between the first locating plate and the transitional plate is 105°, and the angle between the transitional plate and the second locating plate is 115°.

The advantageous effects of the present invention are as follows. The present invention can reduce the connection process of the upper mount bracket of the engine and the front plate of the front wheel cowling from two steps to one step without increasing the cost. As a result, the assembling time is reduced by nearly a half, and the assembling efficiency is doubled, which not only simplifies difficulty in assembling but also reduces labor intensity of the operator efficiently, meanwhile it can avoid damage to the engine mounting and accidental injury to the operator caused by falling of the engine mounting.

DETAILED DESCRIPTION

The present invention will be further described in conjunction with the accompanying drawings and the embodiments.

Figure 1:
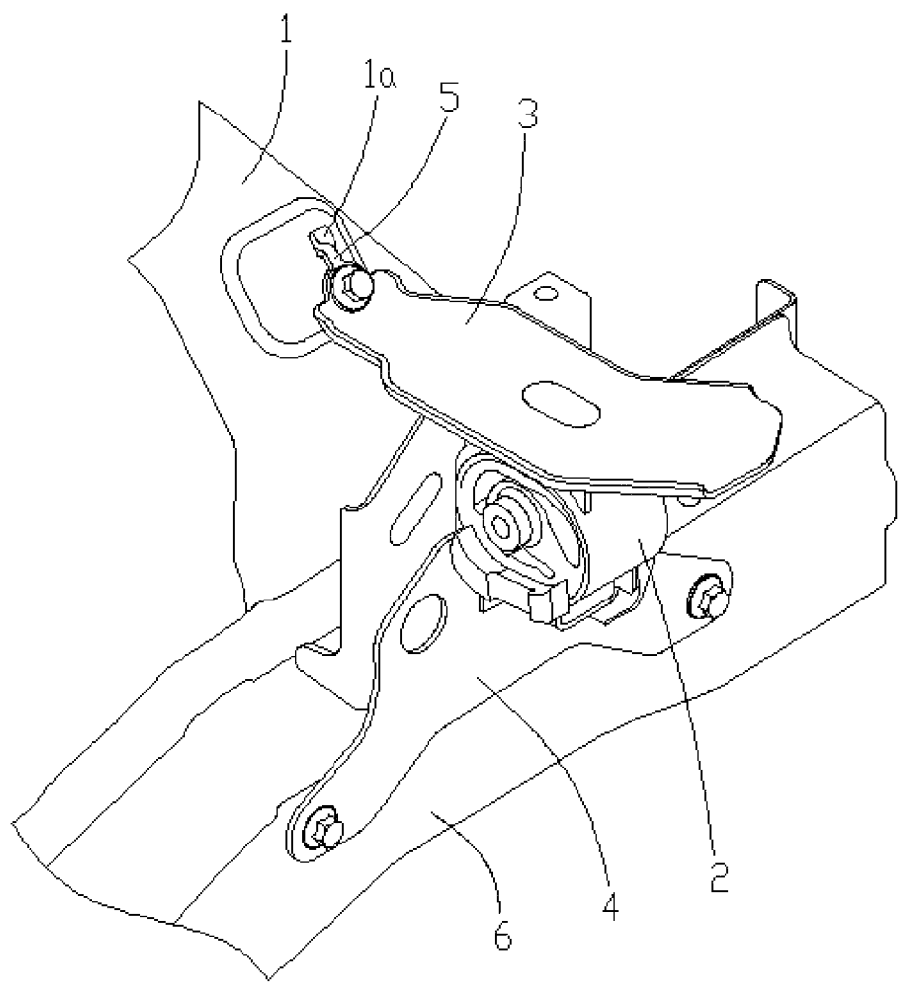
FIG. 1 is a structural schematic view of the present invention.
Figure 2:
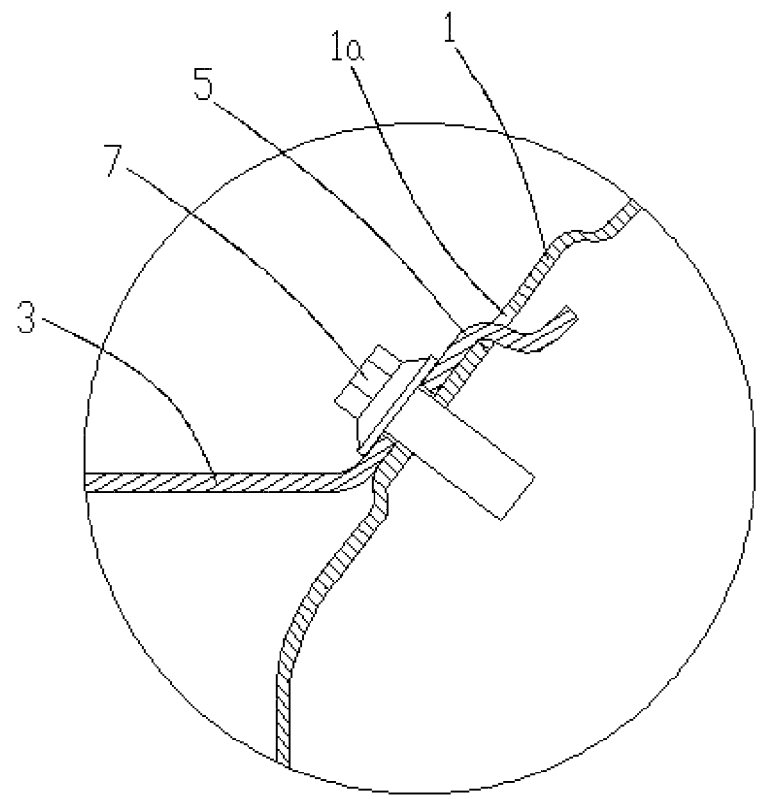
FIG. 2 is a schematic view of a lug and a front plate of a front wheel cowling in the present invention after assembled.
Figure 3:
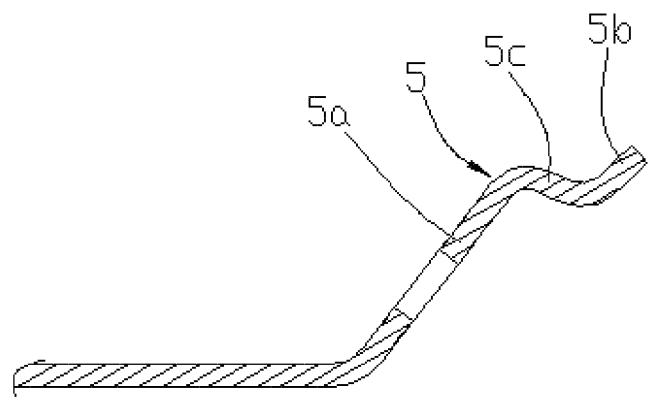
FIG. 3 is a structural schematic view of a lug in the present invention.

As shown in FIGS. 1, 2 and 3, the present invention mainly consists of two parts: an engine mounting and a front plate of a front wheel cowling 1. The front plate of a front wheel cowling 1 is fixed on a stringer 6 of a vehicle body by welding. The engine mounting includes a damper assembly 2, an upper mount bracket 3 and a lower mount bracket 4. The damper assembly 2 is connected to the engine. The lower mount bracket 4 is welded to the lower portion of the damper assembly 2 and is fixed to the stringer 6 of the vehicle body by bolts. The upper mount bracket 3 is welded to the top of the damper assembly 2 and is formed by stamping sheet material. One end of the upper mount bracket 3 corresponding to the front plate of the front wheel cowling 1 is integrally formed with a lug 5. The lug 5 is of a "Z" shape and includes a first locating plate 5a, a second locating plate 5b and a transitional plate 5c. The first locating plate 5a is connected with the second locating plate 5b via the transitional plate 5c. There is an angle ranged from 100° to 110° between the first locating plate 5a and the transitional plate 5c. In this embodiment, the angle between the first locating plate 5a and the transitional plate 5c is preferably 105°. There is an angle ranged from 110° to 120° between the transitional plate 5c and the second locating plate 5b. In this embodiment, the angle between the transitional plate 5c and the second locating plate 5b is preferably 115°.

It can be seen from FIGS. 1, 2 and 3, the first locating plate 5a abuts against the front plate of the front wheel cowling 1 and is fixed thereto by a bolt 7. The front plate of the front wheel cowling 1 is formed with a locating hole 1a, and the position of the locating hole 1a corresponds to that of the lug 5. The shape of the locating hole 1a may be square, circular or any other suitable shape. The second locating plate 5b and the transitional plate 5c of the lug 5 are protruded into the locating hole 1a in the front plate of the front wheel cowling 1. In the present invention, except for the lug 5 and the locating hole 1a, the rest of the structure is the same as that of the prior art and will not be described herein.

What claimed is:

1. A connection structure of a vehicular engine mounting and a front plate of a front wheel cowling, comprising an engine mounting and a front plate of a front wheel cowling,
   wherein the engine mounting comprises a damper assembly, an upper mount bracket and a lower mount bracket, one end of the upper mount bracket corresponding to the front plate of the front wheel cowling is provided with a lug, and
   wherein the lug is of a "Z" shape and comprises a first locating plate, a second locating plate and a transitional plate, the first locating plate and the second locating plate are connected with each other via the transitional plate, and the first locating plate abuts against the front plate of the front wheel cowling and is fixed thereto by bolts; the front plate of the front wheel cowling is formed with a locating hole, and the position of the locating hole corresponds to that of the lug, the second locating plate and the transitional plate of the lug are protruded into the locating hole in the front plate of the front wheel cowling.

2. The connection structure of a vehicular engine mounting and a front plate of a front wheel cowling according to claim 1, wherein the upper mount bracket and the lug are formed into one piece by stamping.

3. The connection structure of a vehicular engine mounting and a front plate of a front wheel cowling according to claim 1, wherein there is an angle ranged from 100° to 110° between the first locating plate and the transitional plate, and there is an angle ranged from 110° to 120° between the transitional plate and the second locating plate.

4. The connection structure of a vehicular engine mounting and a front plate of a front wheel cowling according to claim 3, wherein the angle between the first locating plate and the transitional plate is 105°, and the angle between the transitional plate and the second locating plate is 115°.

5. The connection structure of a vehicular engine mounting and a front plate of a front wheel cowling according to claim 2, wherein there is an angle ranged from 100° to 110° between the first locating plate and the transitional plate, and there is an angle ranged from 110° to 120° between the transitional plate and the second locating plate.

* * * * *